(12) United States Patent
Yang et al.

(10) Patent No.: US 12,063,646 B2
(45) Date of Patent: Aug. 13, 2024

(54) DEMODULATION REFERENCE SIGNAL (DMRS)-LESS SEQUENCE-BASED NONCOHERENT PHYSICAL UPLINK CONTROL CHANNEL TRANSMISSION WITH REPETITION

(71) Applicant: QUALCOMM Incorporated, San Diego, CA (US)

(72) Inventors: Wei Yang, San Diego, CA (US); Ahmed Elshafie, San Diego, CA (US); Yi Huang, San Diego, CA (US); Gokul Sridharan, Sunnyvale, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 17/445,673

(22) Filed: Aug. 23, 2021

(65) Prior Publication Data

US 2022/0124755 A1  Apr. 21, 2022

Related U.S. Application Data

(60) Provisional application No. 63/093,060, filed on Oct. 16, 2020.

(51) Int. Cl.
*H04W 72/0446* (2023.01)
*H04J 13/00* (2011.01)
*H04W 72/1268* (2023.01)

(52) U.S. Cl.
CPC ..... *H04W 72/1268* (2013.01); *H04J 13/0029* (2013.01); *H04W 72/0446* (2013.01)

(58) Field of Classification Search
CPC .......... H04W 72/1268; H04W 72/0446; H04J 13/0029
See application file for complete search history.

(56) References Cited

U.S. PATENT DOCUMENTS 6,292,476 B1 * 9/2001 Zehavi ............... H04J 13/0022
370/335
2016/0309510 A1 * 10/2016 Wong ............... H04W 74/0816
(Continued)

OTHER PUBLICATIONS

CMCC: "Discussion on the PUCCH Coverage Enhancement", 3GPP TSG RAN WG1 #102-e, 3GPP Draft, R1-2006227, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), 4 Pages, XP051917919, Retrieved from the Internet: URL: https://www.3gpp.org/ftp/tsg_ran/WG1_RL1/TSGR1_102-e/Docs/R1-2006227.zip, R1-2006227.docx, [retrieved on Aug. 8, 2020], Section 2.2, Figures 2-3.
(Continued)

*Primary Examiner* — Kent Krueger
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may generate a physical uplink control channel (PUCCH) sequence for a set of PUCCH repetitions, wherein the PUCCH sequence is based at least in part on a PUCCH payload size. The UE may transmit the set of PUCCH repetitions using the PUCCH sequence. Numerous other aspects are provided.

24 Claims, 9 Drawing Sheets

(56) References Cited

U.S. PATENT DOCUMENTS

| | | | | |
|---|---|---|---|---|
| 2018/0279295 | A1* | 9/2018 | Gao | H04W 72/23 |
| 2020/0205150 | A1* | 6/2020 | Cheng | H04W 72/21 |
| 2021/0050895 | A1* | 2/2021 | Kang | H04B 7/0639 |
| 2021/0160855 | A1* | 5/2021 | Gao | H04L 5/0094 |
| 2022/0007400 | A1* | 1/2022 | Zhang | H04L 1/0072 |
| 2022/0030606 | A1* | 1/2022 | Xiong | H04W 52/242 |
| 2022/0353859 | A1* | 11/2022 | Sun | H04L 5/006 |
| 2023/0014328 | A1* | 1/2023 | Sun | H04L 5/0055 |

OTHER PUBLICATIONS

International Search Report and Written Opinion—PCT/US2021/071263—ISA/EPO—Dec. 9, 2021.

Qualcomm Incorporated: "Potential Techniques for Coverage Enhancements", 3GPP TSG-RAN WG1 Meeting #101, 3GPP Draft, R1-2004499, 3rd Generation Partnership Project (3GPP), Mobile Competence Centre, 650, Route Des Lucioles, F-06921 Sophia-Antipolis Cedex, France, vol. Ran WG1. No. e-Meeting; May 25, 2020-Jun. 5, 2020, May 16, 2020 (May 16, 2020), 15 Pages, XP051886228, Retrieved from the Internet: URL: https://www.3gpp.org/ftp/TSG_RAN/WG1_RL1/TSGR1_101-e/Docs/R1-2004499.zip, R1-2004499, Potential techniques for coverage enhancement.docx [retrieved on May 16, 2020], paragraph [06.2], Section 3, figures 2-4.

ZTE Corporation: "Discussion on Potential Techniques for PUCCH Coverage Enhancement", 3GPP TSG RAN WG1 #102-e, 3GPP Draft, R1-2005428, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), pp. 1-5, XP051917453, Retrieved from the Internet: URL: https://www.3gpp.org/ftp/tsg_ran/WG1_RL1/TSGR1_102-e/Docs/R1-2005428.zip, R1-2005428 Discussion on potential techniques for PUCCH coverage enhancements.docx [retrieved on Aug. 8, 2020] Sections 2.1 and 2.2.

* cited by examiner

DEMODULATION REFERENCE SIGNAL (DMRS)-LESS SEQUENCE-BASED NONCOHERENT PHYSICAL UPLINK CONTROL CHANNEL TRANSMISSION WITH REPETITION

CROSS-REFERENCE TO RELATED APPLICATION

This Patent Application claims priority to U.S. Provisional Patent Application No. 63/093,060, filed on Oct. 16, 2020, entitled "DEMODULATION REFERENCE SIGNAL (DMRS)-LESS SEQUENCE-BASED NONCOHERENT PHYSICAL UPLINK CONTROL CHANNEL TRANSMISSION WITH REPETITION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal (DMRS)-less sequence-based noncoherent physical uplink control channel (PUCCH) transmission with repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes generating a physical uplink control channel (PUCCH) sequence for a set of PUCCH repetitions, wherein the PUCCH sequence is based at least in part on a PUCCH payload size; and transmitting the set of PUCCH repetitions using the PUCCH sequence.

In some aspects, a UE for wireless communication includes a memory; and one or more processors coupled to the memory, the one or more processors configured to: generate a PUCCH sequence for a set of PUCCH repetitions, wherein the PUCCH sequence is based at least in part on a PUCCH payload size; and transmit the set of PUCCH repetitions using the PUCCH sequence.

In some aspects, a non-transitory computer-readable medium storing a set of instructions for wireless communication includes one or more instructions that, when executed by one or more processors of a UE, cause the UE to: generate a PUCCH sequence for a set of PUCCH repetitions, wherein the PUCCH sequence is based at least in part on a PUCCH payload size; and transmit the set of PUCCH repetitions using the PUCCH sequence.

In some aspects, an apparatus for wireless communication includes means for generating a PUCCH sequence for a set of PUCCH repetitions, wherein the PUCCH sequence is based at least in part on a PUCCH payload size; and means for transmitting the set of PUCCH repetitions using the PUCCH sequence.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
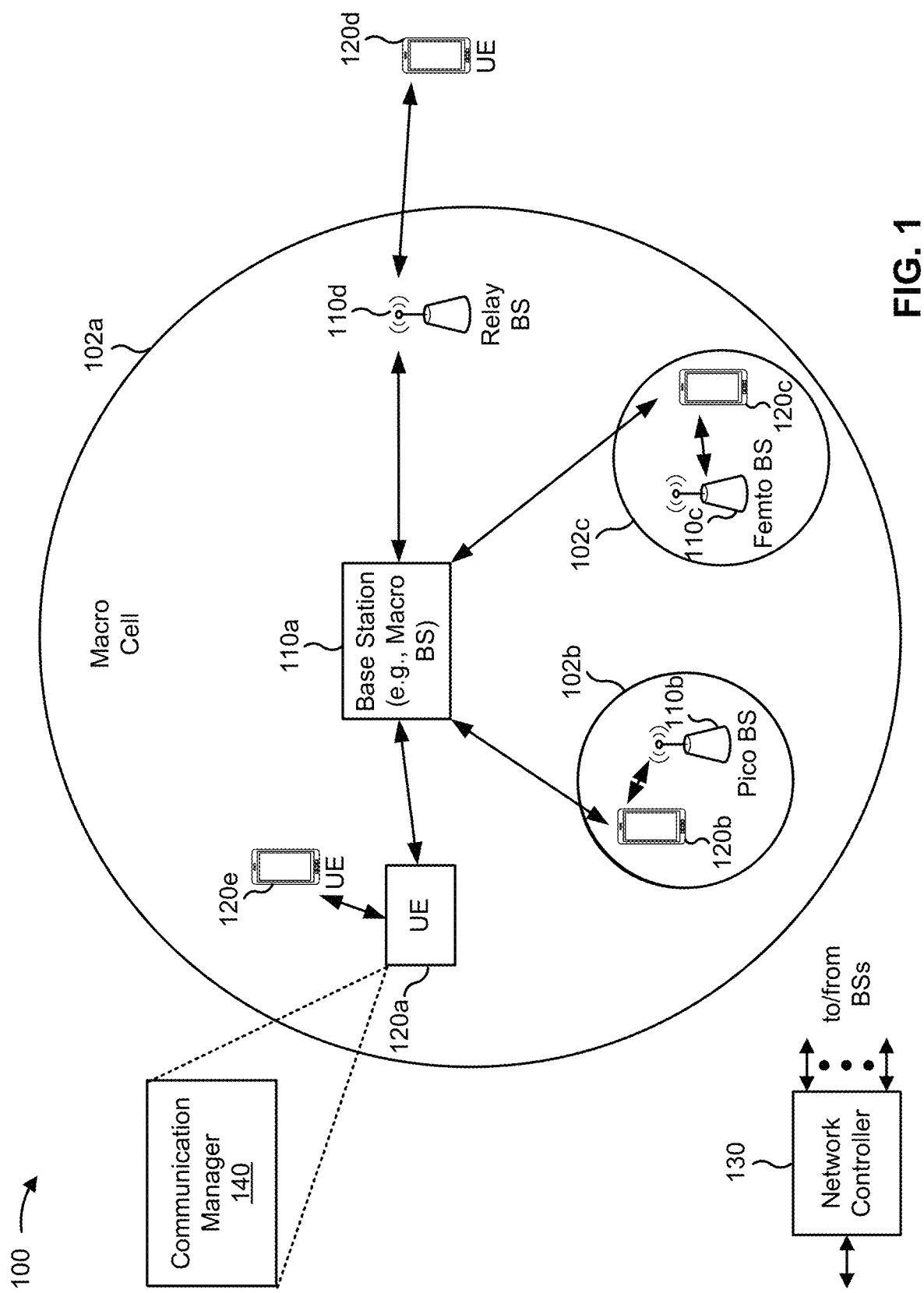
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may generate a physical uplink control channel (PUCCH) sequence for a set of PUCCH repetitions, wherein the PUCCH sequence is based at least in part on a PUCCH payload size; and transmit the set of PUCCH repetitions using the PUCCH sequence. Additionally, or alternatively, the communication manager 140 may perform one or more other operations described herein.

As indicated above, FIG. 1 is provided as an example. Other examples may differ from what is described with regard to FIG. 1.

Figure 2:
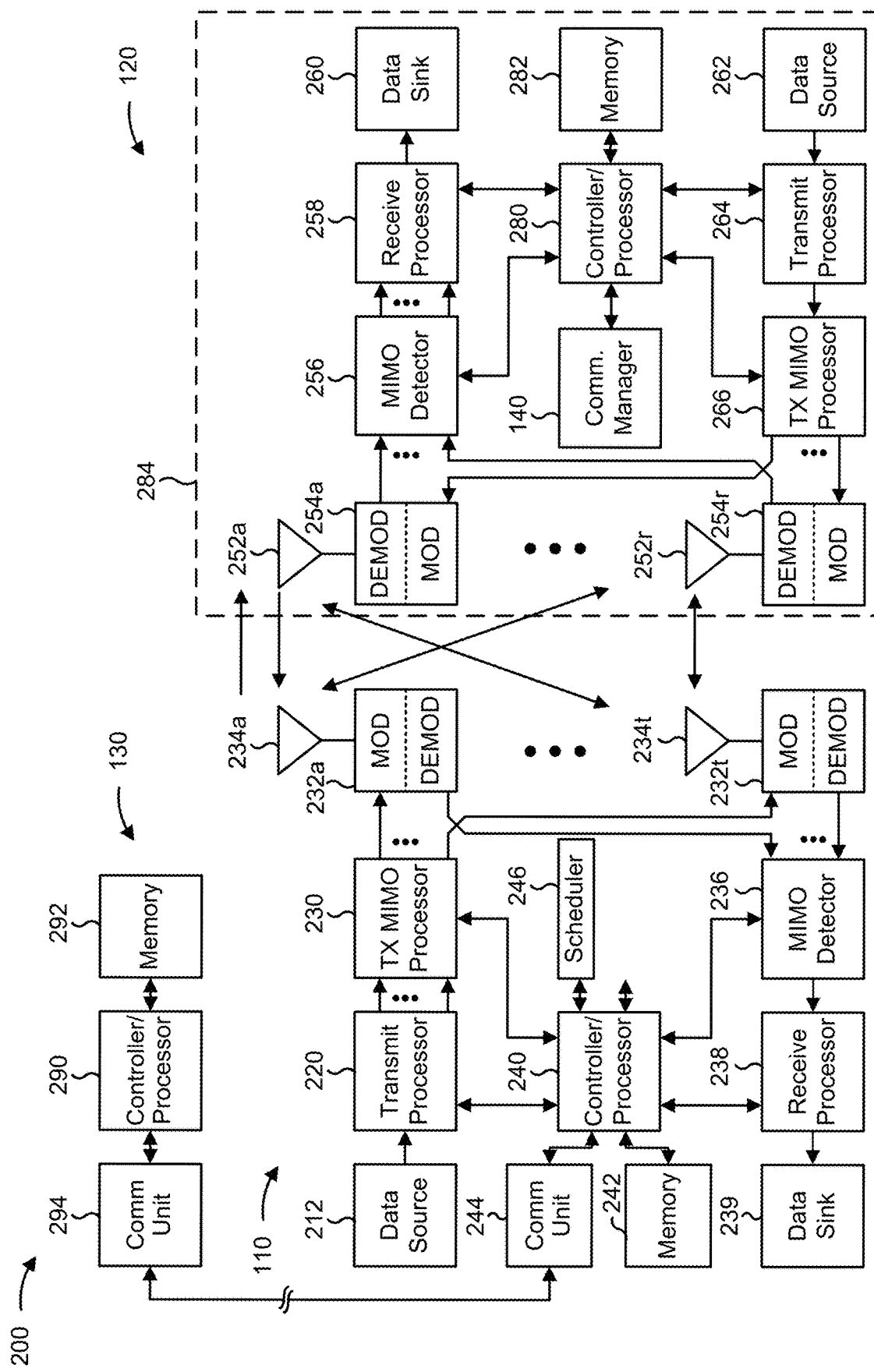
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6B).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6B).

The controller/processor 240 of the base station 110, the controller/processor 280 of the UE 120, and/or any other component(s) of FIG. 2 may perform one or more techniques associated with demodulation reference signal (DMRS)-less sequence-based noncoherent physical uplink control channel (PUCCH) transmission with repetition, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some examples, executing instructions may include running the instructions, converting the instructions, compiling the instructions, and/or interpreting the instructions, among other examples.

In some aspects, the user equipment (UE) includes means for generating a physical uplink control channel (PUCCH) sequence for a set of PUCCH repetitions, wherein the PUCCH sequence is based at least in part on a PUCCH payload size; and/or means for transmitting the set of PUCCH repetitions using the PUCCH sequence. The means for the user equipment (UE) to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
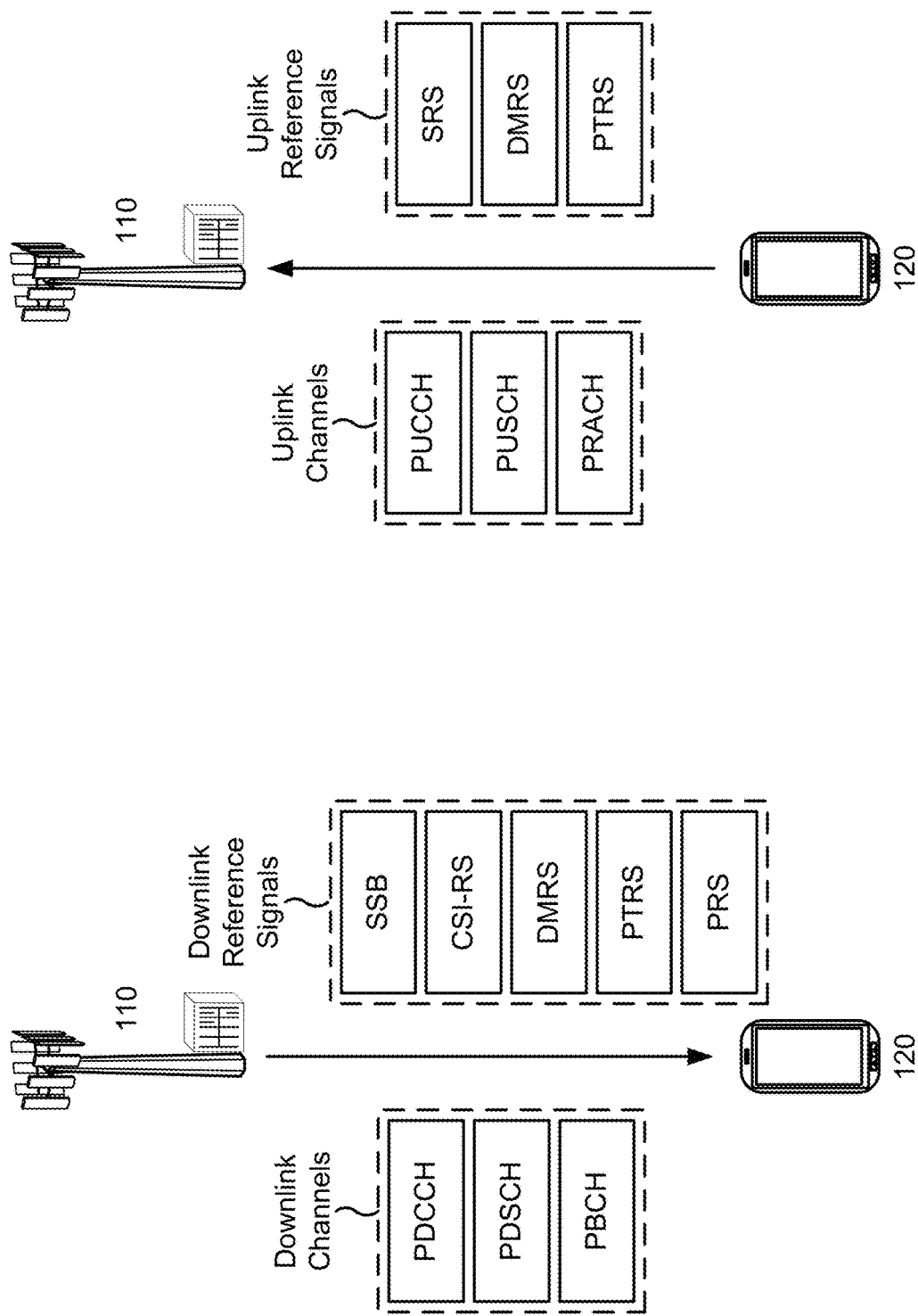
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
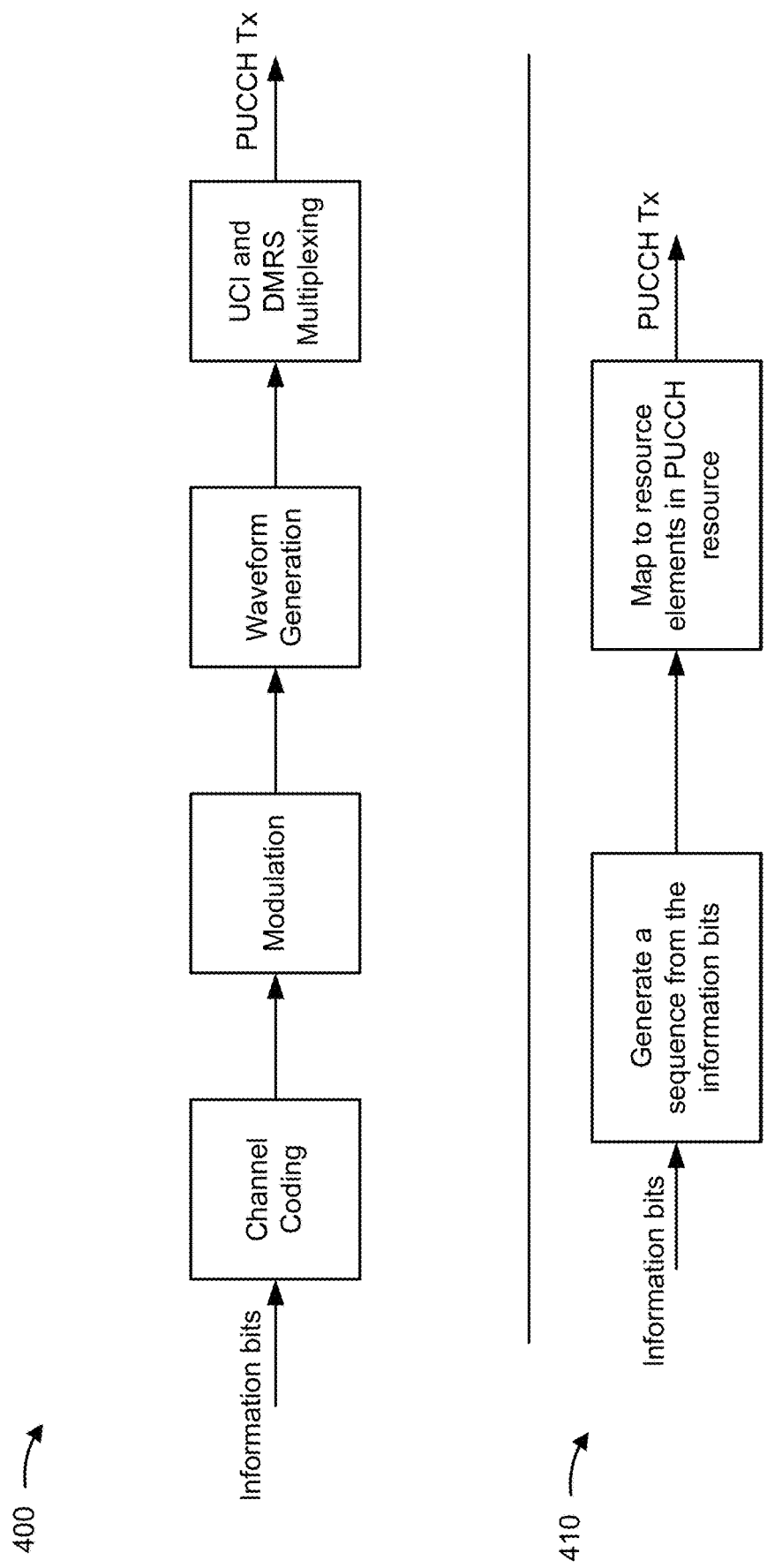
FIG. 4 is a diagram illustrating an example of demodulation reference signal (DMRS)-based coherent and DMRS-less non-coherent physical uplink control channel (PUCCH) transmission, in accordance with the present disclosure.

FIG. 4 is a diagram illustrating examples 400/410 of DMRS-based coherent and DMRS-less non-coherent PUCCH transmission, in accordance with the present disclosure.

As shown in FIG. 4, and by example 400, a UE may perform DMRS-based coherent transmission for PUCCH transmission (e.g., PUCCH formats 1, 2, 3, and 4). For example, the UE may receive a set of k information bits and perform channel coding, modulation, and waveform generation on the k information bits. After performing waveform generation, the UE may multiplex uplink control information (UCI) with a DMRS (e.g., based at least in part on a DMRS sequence) to generate a PUCCH transmission for output. However, DMRS-based coherent communication may have performance loss at relatively low (e.g., less than a threshold) signal to noise ratio (SNR) values. For example, a channel estimation quality may be relatively poor at relatively low SNR values, channel coding may not be optimized for low data rates, or DMRS overhead may be excessive, among other examples. Such low SNR values may occur at, for example, cell edges. Poor channel estimation at the receiver (e.g., a BS) may result in decoding errors, which may negative impact communication performance.

Thus, as further shown in FIG. 4, and by example 410, the UE may use sequence-based DMRS-less non-coherent transmission. In this case, the UE may generate a sequence based at least in part on the k information bits, and the UE may map the sequence to N resource elements in a PUCCH resource to generate a PUCCH transmission (e.g., PUCCH format 0) for output. The UE may use orthogonal sequences for relatively small payload sizes (e.g., less than a threshold payload size) and non-orthogonal sequences for relatively large payload sizes (e.g., greater than or equal to the threshold payload size). In this way, the UE may optimize for different payload sizes and avoid issues present with DMRS-based coherent transmission in low SNR scenarios, such as at cell edges. This may occur because sequence-based PUCCH may obviate channel estimation issues that occur with DMRS at low SNR values and have improved bit error rate (BER) performance, thereby resulting in less performance degradation for sequence-based PUCCH than for DMRS-based PUCCH.

As indicated above, FIG. 4 is provided as an example. Other examples may differ from what is described with respect to FIG. 4.

Figure 5:
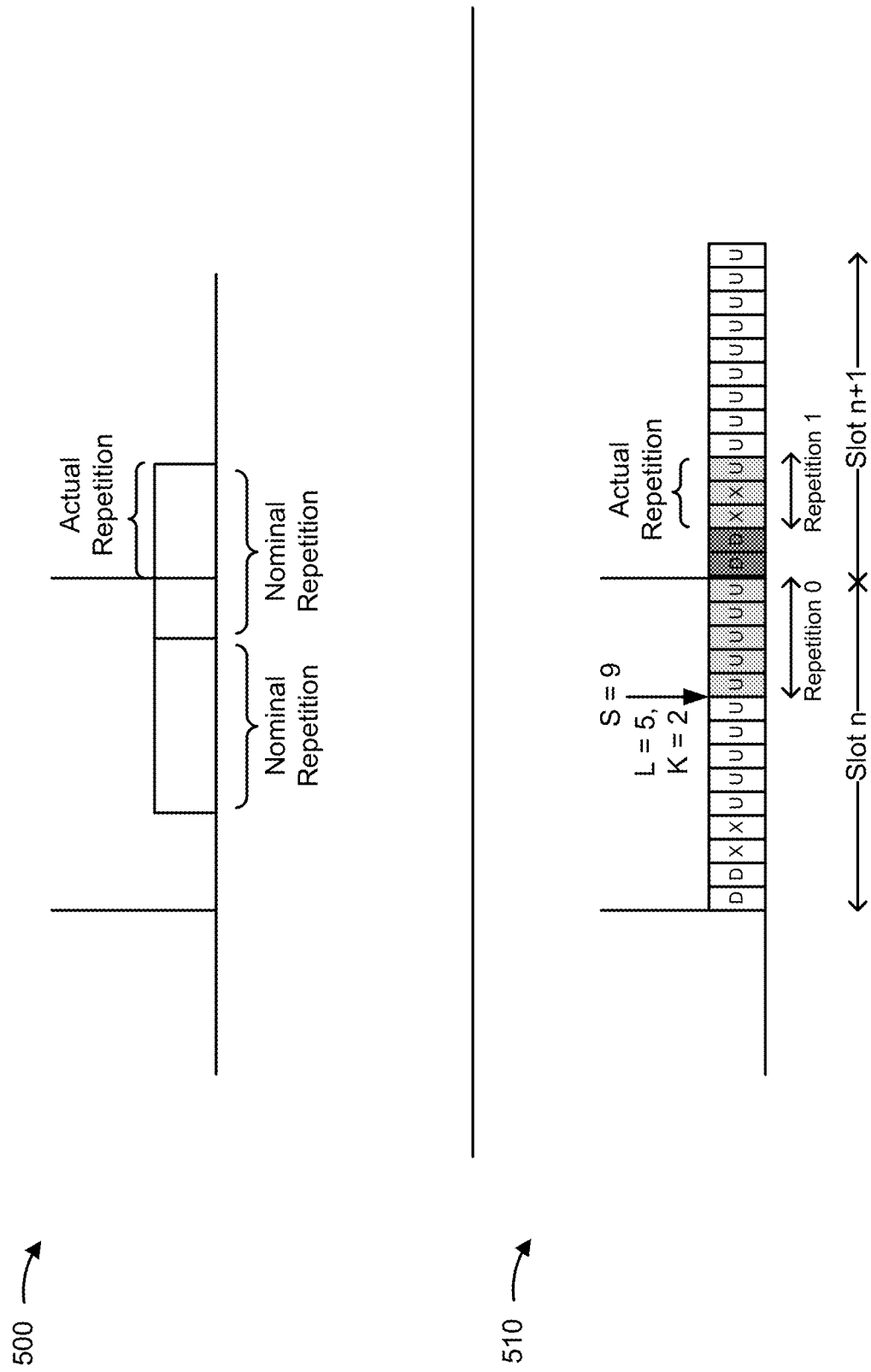
FIG. 5 is a diagram illustrating an example of PUCCH repetition, in accordance with the present disclosure.

FIG. 5 is a diagram illustrating examples 500/510 of PUCCH repetition, in accordance with the present disclosure.

As shown in FIG. 5, and by example 500, a UE may transmit a plurality of repetitions of a PUCCH communication to improve link budget and associated communication performance in low SNR scenarios, such as at cell edges. For example, the UE may transmit a first repetition of the PUCCH communication and a second repetition of the PUCCH communication. In some cases, a repetition may cross a slot boundary. For example, as shown in example 500, a first nominal repetition (e.g., a first scheduled repetition) may occur entirely in a first slot, and a second nominal repetition may occur partially in the first slot and partially in a second slot. In the case of Type-B PUCCH repetition, a nominal repetition that crosses a slot boundary may be split into multiple actual repetitions. Similarly, as shown by example 510, when a nominal repetition collides with one or more downlink symbols (D), the nominal repetition may be split into a plurality of actual repetitions for transmission using a plurality of uplink (U) or flexible (X) symbols.

As indicated above, FIG. 5 is provided as an example. Other examples may differ from what is described with respect to FIG. 5.

When transmitting a DMRS-less non-coherent PUCCH communication, the UE may map a PUCCH sequence to a set of resource elements in a PUCCH resource. When at a cell edge, the UE may use PUCCH repetition to transmit a plurality of repetitions of a PUCCH communication to achieve improved communication performance. However, in such cases, the UE and a BS may not have a defined mapping of the PUCCH sequence to the subsequent PUCCH repetitions. Moreover, the UE and the BS may not have a defined mapping of the PUCCH sequence to the subsequent PUCCH repetitions when a PUCCH repetition crosses a slot boundary.

Some aspects described herein may define a mapping of a PUCCH sequence to a set of PUCCH repetitions. For example, the UE may generate a short PUCCH sequence, as described in more detail herein, and may generate the whole short PUCCH sequence to each PUCCH repetition of the set of PUCCH repetitions. Additionally, or alternatively, the UE may generate a long PUCCH sequence, as described in more detail herein, and may split the long PUCCH sequence, such that a first portion of the long PUCCH sequence maps to a first PUCCH repetition, a second portion of the long PUCCH sequence maps to a second PUCCH repetition, and/or the like. In this way, the UE enables DMRS-less non-coherent PUCCH transmission with repetition, thereby improving performance at, for example, cell edges.

Figure 6A:
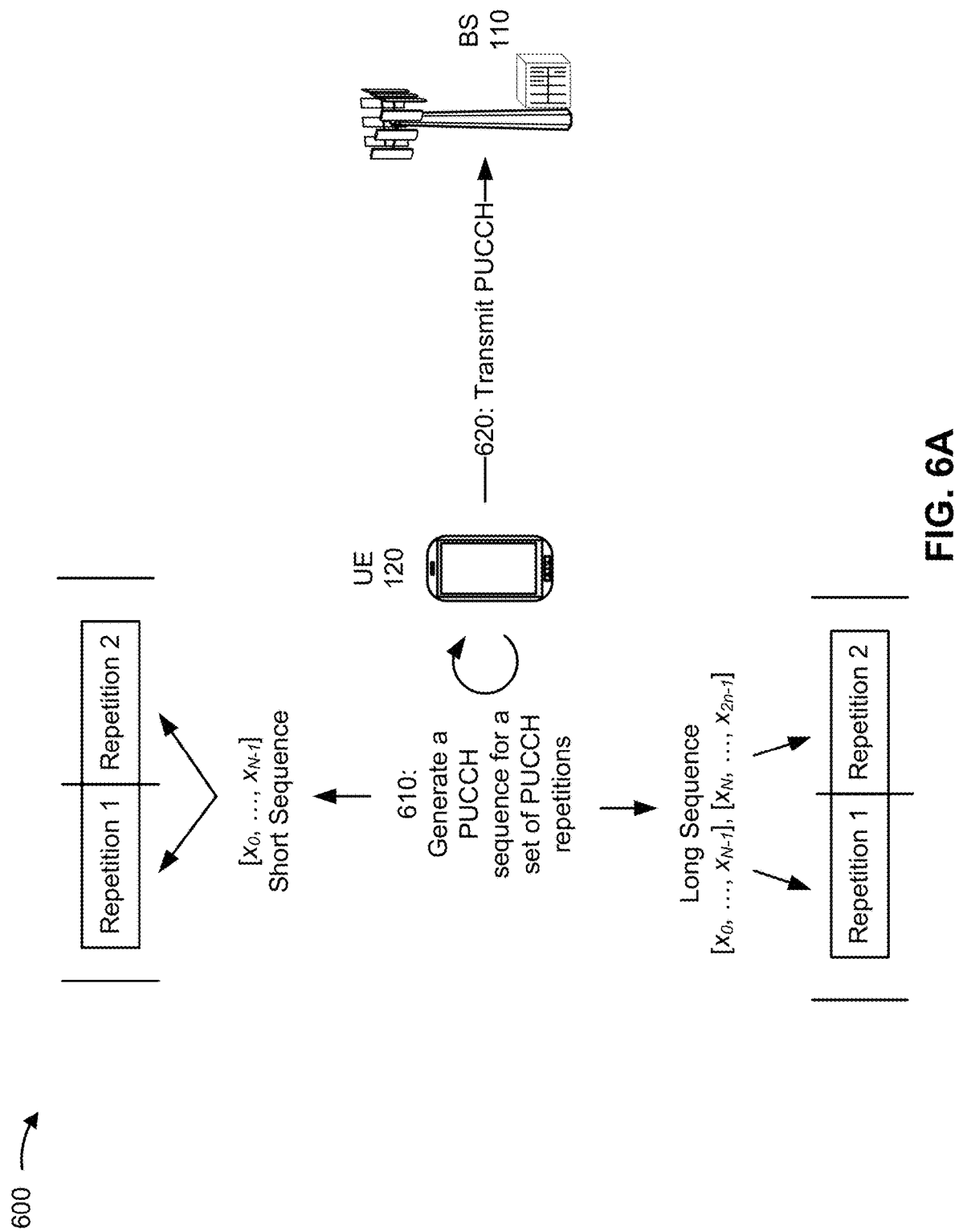
FIGS. 6A-6B are diagrams illustrating examples associated with DMRS-less non-coherent PUCCH transmission with repetition, in accordance with the present disclosure.
Figure 6B:
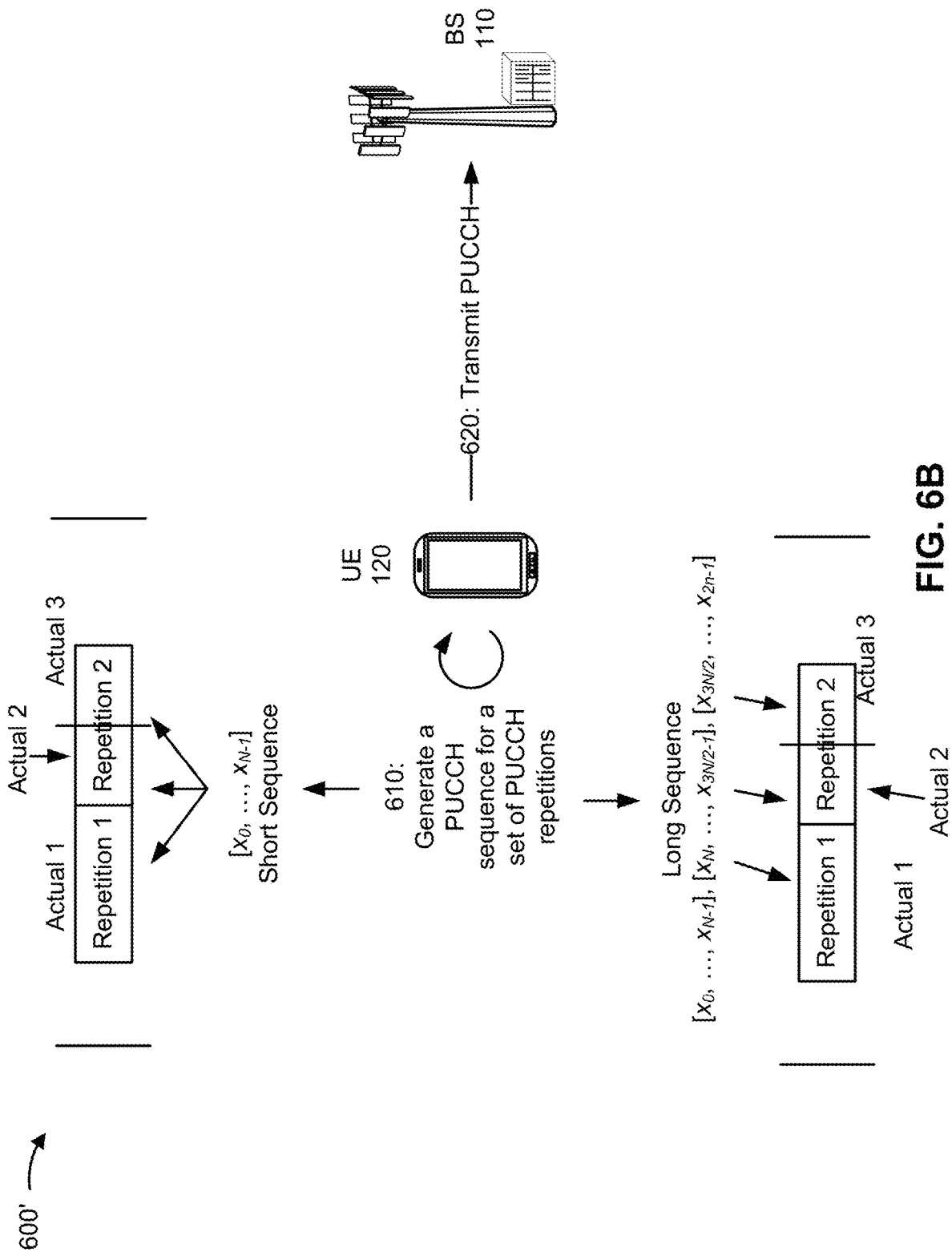

FIGS. 6A and 6B are diagrams illustrating examples 600/600' associated with DMRS-less non-coherent PUCCH transmission with repetition, in accordance with the present disclosure. As shown in FIGS. 6A and 6B, examples 600/610' include communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 6A, and by reference number 610, UE 120 may generate a PUCCH sequence for a set of PUCCH repetitions. For example, UE 120 may generate a short PUCCH sequence with a single set of (less than a threshold quantity of) elements: $[x_0, \ldots x_{N-1}]$. In this case, UE 120 may map the short sequence to each repetition. For example, UE 120 may map the short sequence (e.g., starting with element $x_0$) to repetition 1 and may map the short sequence (e.g., again starting with element $x_0$) to repetition 2. Additionally, or alternatively, UE 120 may generate a long PUCCH sequence with a plurality of sets of elements (e.g., totaling greater than or equal to a threshold quantity of elements): $[x_0, \ldots, x_{N-1}], [x_N, \ldots, x_{2N-1}]$. In this case, UE 120 may map respective sets of elements to respective repetitions of a PUCCH communication. For example, UE 120 may map a first set of elements (e.g., starting with $x_0$) to the first repetition and a second set of elements (e.g., starting with $x_N$) to the second repetition.

As shown in FIG. 6B, when a repetition crosses a slot boundary, UE 120 may divide the repetition for mapping. For example, with regard to the short sequence, repetition 1 may be a first nominal repetition entirely within a first slot, and repetition 2 may be a second nominal repetition that crosses from the first slot to the second slot. In this case, UE 120 may generate a first actual repetition from repetition 1 and may divide repetition 2 into a second actual repetition (e.g., a first portion of repetition 2 that occurs in the first slot) and a third actual repetition (e.g., a second portion of repetition 2 that occurs in the second slot). As a result, UE 120 may map the short sequence to each actual repetition rather than each nominal repetition. For example, UE 120 maps the short sequence to actual repetition 1 (e.g., starting with element $x_0$), actual repetition 2 (e.g., starting with element $x_0$), and actual repetition 3 (e.g., starting with element $x_0$). In other words, UE 120 repeats the short sequence for each repetition. In contrast, with regard to a long sequence, UE 120 may map a first set of elements of the long sequence to the first actual repetition (e.g., starting with element $x_0$), a second set of elements of the long sequence to the second actual repetition (e.g., starting with element $x_N$), and a third set of elements of the long sequence to a third actual repetition (e.g., starting with element $x_{3N/2}$). In other words, UE 120 uses a different set of elements, selected from the long sequence, for each repetition.

In some aspects, UE 120 may use an M-sequence for the short or long PUCCH sequence. For example, an M-sequence may be represented by a generator polynomial as:

$$x^n + a_{n-1}x^{n-1} + \ldots + a_1 x + 1$$

where $(a_{n-1}, \ldots, a_1)$ are binary coefficients. UE 120 may use a recursive relation with non-zero initialization to generate a sequence from the M-sequence:

$$x(i+n) = (a_{n-1}x(i+n-1) + \ldots + a_1 x(i+1) + x(i)) \bmod 2$$

where the non-zero initialization is based at least in part on input information bits $[x(n-1), \ldots, x(1), x(0)]$.

In some aspects, UE 120 may use a Gold sequence or a pseudorandom-noise (PN) sequence for the short or long PUCCH sequence. For example, UE 120 may generate a pseudo-random sequence based at least in part on, for example, a length-31 Gold sequence. In this case, the output of a sequence c(n) of length $M_{PN}$ may be defined as:

$$c(n) = (x_1(n+N_C) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_c = 1600$ and the first m-sequence $x_1(n)$ is initialized by $x_1(0) = 1$, $x_1(n) = 0$, for $n = 1, 2, \ldots, 30$. Further, the initialization of the second m-sequence, $x_2(n)$, is denoted by $c_{init} = \Sigma_{i=0}^{30} x_2(i) \cdot 2^i$. In this case, UE 120 may use the same generator to output bit sequences for each resource element of each repetition.

In some aspects, UE 120 may select a type of sequence based at least in part on one or more decision criteria. For example, UE 120 may select between a long sequence or a short sequence based at least in part on whether orthogonal sequences are to be used or non-orthogonal sequences are to be used. In this case, for orthogonal sequences, UE 120 may select a short sequence and, for non-orthogonal sequences, UE 120 may select a long sequence. Although some aspects are described herein in terms of a particular set of decision criteria and outcomes, other decision criteria and outcomes are possible, such as orthogonal sequences corresponding to a long sequence and non-orthogonal sequences corresponding to a short sequence.

Additionally, or alternatively, UE 120 may select between long or short sequences based at least in part on a PUCCH payload size, whether PUCCH repetition crosses a slot boundary (e.g., PUCCH repetition type A, where the PUCCH repetition does not cross the slot boundary, or PUCCH repetition type B, where the PUCCH repetition crosses the slot boundary), a coding rate of a nominal repetition, an effective coding rate across each PUCCH repetition, or an indication received from BS 110, among other examples.

In some aspects, UE 120 may determine a sequence based at least in part on a characteristic of the PUCCH repetitions. For example, UE 120 may determine the long sequence based at least in part on a quantity of scheduled nominal repetitions. In this case, UE 120 may generate the long sequence with a plurality of sets of elements, and the quantity of sets of elements may be based at least in part on the quantity of scheduled nominal repetitions. When UE 120 divides a nominal repetition into a plurality of actual repetitions, UE 120 may similarly divide a set of elements into a plurality of subsets of elements and map respective subsets of elements to respective actual repetitions. As an example, UE 120 may be scheduled with 3 nominal repetitions, each including N resource elements, and the second nominal repetition is split into two actual repetitions with $N_1$ and $N_2$ resource elements. In this case, UE 120 may generate a first long sequence of length 3N for the 3 nominal repetitions. For each actual repetition that is also a nominal repetition (e.g., the first and third nominal repetitions, which may be the first and fourth actual repetitions), UE 120 may transmit the corresponding segment of the long sequence (e.g., a first set of elements of length N and a third set of elements of length N). In contrast, for the second nominal repetition (e.g., which is split into the second and third actual repetitions), UE 120 may transmit respective parts of the second set of elements (e.g., a first subset corresponding to a first $N_1$ elements for the second actual repetition and a second subset corresponding to a second $N_2$ elements for the third actual repetition) to convey the second nominal repetition.

Additionally, or alternatively, UE 120 may determine the long sequence based at least in part on a quantity of actual repetitions. In this case, UE 120 may generate a set of elements for each actual repetition and map a respective set of elements to each actual repetition. Returning to the above example, in this case, UE 120 may generate a long sequence of length 4N for the 4 actual repetitions. In this case, UE 120 uses the first set of elements for the first actual repetition (which is of length N), a first $N_1$ elements of the second set of elements for the second actual repetition (which is of length $N_1$), a first $N_2$ elements of the third set of elements for the third actual repetition (which is of length $N_2$), and the fourth set of elements for the fourth actual repetition (which is of length N).

As further shown in FIGS. 6A and 6B, and by reference number 620, based at least in part on generating the PUCCH sequences and mapping the PUCCH sequences to resource elements of PUCCH repetitions, UE 120 may transmit the PUCCH repetitions. For example, UE 120 may transmit a plurality of PUCCH repetitions (e.g., where nominal PUCCH repetitions that cross a slot boundary are transmitted as a plurality of actual PUCCH repetitions that do not cross the slot boundary).

As indicated above, FIG. 6 is provided as an example. Other examples may differ from what is described with respect to FIG. 6.

Figure 7:
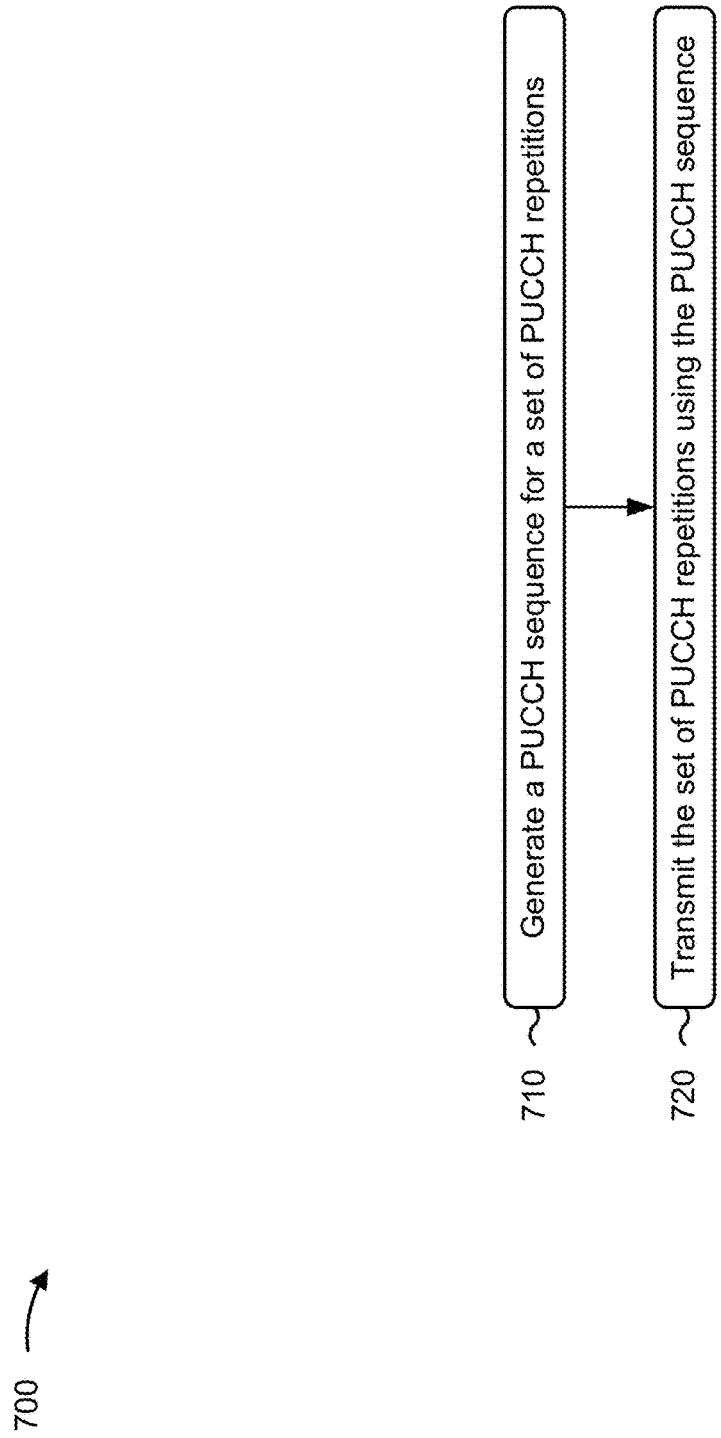
FIG. 7 is a diagram illustrating an example process associated with DMRS-less non-coherent PUCCH transmission with repetition, in accordance with the present disclosure.

FIG. 7 is a diagram illustrating an example process 700 performed, for example, by a user equipment UE, in accordance with the present disclosure. Example process 700 is an example where the UE (e.g., UE 120) performs operations associated with DMRS-less sequence-based noncoherent PUCCH transmission with repetition.

As shown in FIG. 7, in some aspects, process 700 may include generating a PUCCH sequence for a set of PUCCH repetitions (block 710). For example, the UE (e.g., using PUCCH sequence generation component 808, depicted in FIG. 8) may generate a PUCCH sequence for a set of PUCCH repetitions, as described above. In some aspects, the PUCCH sequence is based at least in part on a PUCCH payload size.

As further shown in FIG. 7, in some aspects, process 700 may include transmitting the set of PUCCH repetitions using the PUCCH sequence (block 720). For example, the UE (e.g., using transmission component 804, depicted in FIG. 8) may transmit the set of PUCCH repetitions using the PUCCH sequence, as described above.

Process 700 may include additional aspects, such as any single aspect or any combination of aspects described below and/or in connection with one or more other processes described elsewhere herein.

In a first aspect, the PUCCH sequence is a single PUCCH sequence with greater than a threshold quantity of elements, and wherein transmitting the set of PUCCH repetitions comprises transmitting a first repetition, of the set of PUCCH repetitions, using a first portion of the single PUCCH sequence, and transmitting a second repetition, of the set of PUCCH repetitions, using a second portion of the single PUCCH sequence.

In a second aspect, alone or in combination with the first aspect, the PUCCH sequence is a single PUCCH sequence with less than or equal to a threshold quantity of elements, and wherein transmitting the set of PUCCH repetitions comprises transmitting a first repetition, of the set of PUCCH repetitions, using an entirety of the single PUCCH sequence, and transmitting a second repetition, of the set of PUCCH repetitions, using the entirety of the single PUCCH sequence.

In a third aspect, alone or in combination with one or more of the first and second aspects, the PUCCH sequence is a Gold-sequence or an M-sequence.

In a fourth aspect, alone or in combination with one or more of the first through third aspects, process 700 includes generating the set of PUCCH repetitions using the PUCCH sequence.

In a fifth aspect, alone or in combination with one or more of the first through fourth aspects, generating the set of PUCCH repetitions comprises generating a set of bit sequences using a single generator for each resource element of each PUCCH repetition of the set of PUCCH repetitions.

In a sixth aspect, alone or in combination with one or more of the first through fifth aspects, process 700 includes determining a PUCCH sequence configuration for the PUCCH sequence, and wherein generating the PUCCH sequence comprises generating the PUCCH sequence in accordance with the PUCCH sequence configuration.

In a seventh aspect, alone or in combination with one or more of the first through sixth aspects, the PUCCH sequence configuration includes at least one of a size of the PUCCH sequence or an indication whether the PUCCH sequence is to be split or repeated across the set of PUCCH repetitions.

In an eighth aspect, alone or in combination with one or more of the first through seventh aspects, determining the PUCCH sequence configuration comprises determining the PUCCH sequence configuration based at least in part on at least one of whether an orthogonal or non-orthogonal sequence is to be used for the PUCCH sequence, a type of PUCCH repetition scheme, the PUCCH payload size, a coding rate of a nominal PUCCH repetition, an effective rate of the set of PUCCH repetitions, or a received indication.

In a ninth aspect, alone or in combination with one or more of the first through eighth aspects, the set of PUCCH repetitions is a set of actual PUCCH repetitions, and wherein transmitting the set of PUCCH repetitions comprises splitting a nominal PUCCH repetition, of a set of nominal PUCCH repetitions, into a plurality of actual PUCCH repetitions, of the set of actual PUCCH repetitions, wherein the nominal PUCCH repetition is a particular PUCCH repetition that is scheduled across a slot boundary, and transmitting the set of actual PUCCH repetitions based at least in part on splitting the nominal PUCCH repetition into a plurality of actual PUCCH repetitions.

In a tenth aspect, alone or in combination with one or more of the first through ninth aspects, the PUCCH sequence is based at least in part on a quantity of PUCCH repetitions in the set of nominal PUCCH repetitions, and wherein the plurality of actual PUCCH repetitions are encoded based at least in part on the PUCCH sequence.

In an eleventh aspect, alone or in combination with one or more of the first through tenth aspects, the PUCCH sequence is based at least in part on a quantity of PUCCH repetitions in the set of actual PUCCH repetitions, and wherein the plurality of actual PUCCH repetitions are encoded based at least in part on the PUCCH sequence.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
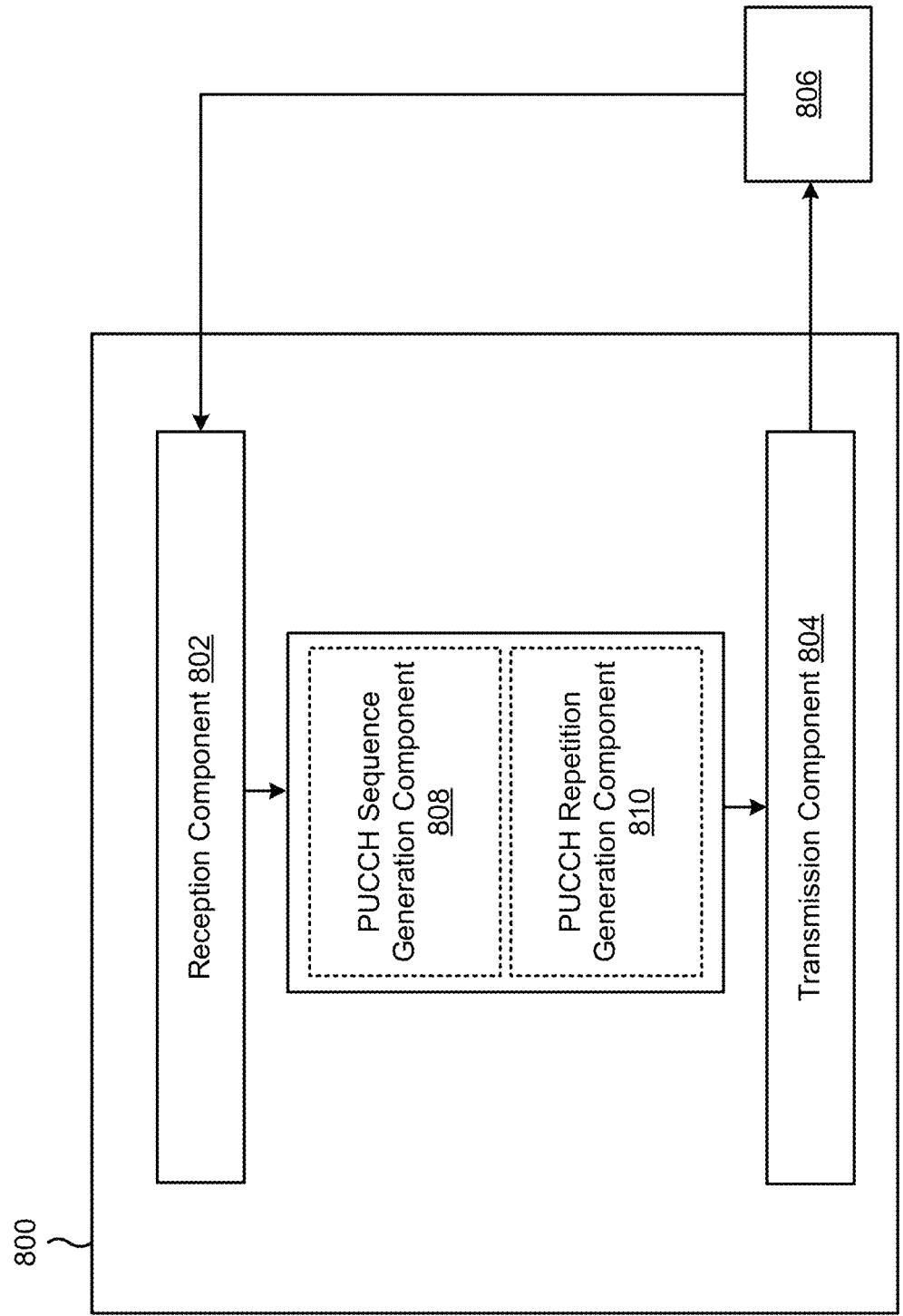
FIG. 8 is a block diagram of an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a PUCCH sequence generation component 808 or a PUCCH repetition generation component 810, among other examples.

In some aspects, the apparatus 800 may be configured to perform one or more operations described herein in connection with FIGS. 6A-6B. Additionally, or alternatively, the apparatus 800 may be configured to perform one or more processes described herein, such as process 700 of FIG. 7, among other examples. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The PUCCH sequence generation component 808 may generate a PUCCH sequence for a set of PUCCH repetitions. The PUCCH sequence generation component 808 may generate a PUCCH long sequence or a PUCCH short sequence, among other examples. In some aspects, the PUCCH sequence generation component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 804 may transmit the set of PUCCH repetitions using the PUCCH sequence.

The PUCCH repetition generation component 810 may generate a PUCCH repetition for transmission. The PUCCH repetition generation component 810 may split a nominal PUCCH repetition into a plurality of actual PUCCH repetitions. In some aspects, the PUCCH repetition generation component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 804 may transmit the set of PUCCH repetitions using the PUCCH sequence.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: generating a physical uplink control channel (PUCCH) sequence for a set of PUCCH repetitions, wherein the PUCCH sequence is based at least in part on a PUCCH payload size; and transmitting the set of PUCCH repetitions using the PUCCH sequence.

Aspect 2: The method of Aspect 1, wherein the PUCCH sequence is a single PUCCH sequence with greater than a threshold quantity of elements; and wherein transmitting the set of PUCCH repetitions comprises: transmitting a first repetition, of the set of PUCCH repetitions, using a first portion of the single PUCCH sequence; and transmitting a second repetition, of the set of PUCCH repetitions, using a second portion of the single PUCCH sequence.

Aspect 3: The method of any of Aspect 1 to 2, wherein the PUCCH sequence is a single PUCCH sequence with less than or equal to a threshold quantity of elements; and wherein transmitting the set of PUCCH repetitions comprises: transmitting a first repetition, of the set of PUCCH repetitions, using an entirety of the single PUCCH sequence; and transmitting a second repetition, of the set of PUCCH repetitions, using the entirety of the single PUCCH sequence.

Aspect 4: The method of any of Aspect 1 to 3, wherein the PUCCH sequence is a Gold-sequence or an M-sequence.

Aspect 5: The method of any of Aspect 1 to 4, further comprising: generating the set of PUCCH repetitions using the PUCCH sequence.

Aspect 6: The method of Aspect 5, wherein generating the set of PUCCH repetitions comprises: generating a set of bit sequences using a single generator for each resource element of each PUCCH repetition of the set of PUCCH repetitions.

Aspect 7: The method of any of Aspect 1 to 6, further comprising: determining a PUCCH sequence configuration for the PUCCH sequence; and wherein generating the PUCCH sequence comprises: generating the PUCCH sequence in accordance with the PUCCH sequence configuration.

Aspect 8: The method of Aspect 7, wherein the PUCCH sequence configuration includes at least one of: a size of the PUCCH sequence or an indication whether the PUCCH sequence is to be split or repeated across the set of PUCCH repetitions.

Aspect 9: The method of any of Aspect 7 to 8, wherein determining the PUCCH sequence configuration comprises: determining the PUCCH sequence configuration based at least in part on at least one of: whether an orthogonal or non-orthogonal sequence is to be used for the PUCCH sequence, a type of PUCCH repetition scheme, the PUCCH payload size, a coding rate of a nominal PUCCH repetition, an effective rate of the set of PUCCH repetitions, or a received indication.

Aspect 10: The method of any of Aspect 1 to 9, wherein the set of PUCCH repetitions is a set of actual PUCCH repetitions, and wherein transmitting the set of PUCCH repetitions comprises: splitting a nominal PUCCH repetition, of a set of nominal PUCCH repetitions, into a plurality of actual PUCCH repetitions, of the set of actual PUCCH repetitions, wherein the nominal PUCCH repetition is a particular PUCCH repetition that is scheduled across a slot boundary; and transmitting the set of actual PUCCH repetitions based at least in part on splitting the nominal PUCCH repetition into a plurality of actual PUCCH repetitions.

Aspect 11: The method of Aspect 10, wherein the PUCCH sequence is based at least in part on a quantity of PUCCH repetitions in the set of nominal PUCCH repetitions; and wherein the plurality of actual PUCCH repetitions are encoded based at least in part on the PUCCH sequence.

Aspect 12: The method of any of Aspect 10 to 11, wherein the PUCCH sequence is based at least in part on a quantity of PUCCH repetitions in the set of actual PUCCH repetitions; and wherein the plurality of actual PUCCH repetitions are encoded based at least in part on the PUCCH sequence.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      generate a physical uplink control channel (PUCCH) sequence for a set of PUCCH repetitions, wherein the PUCCH sequence is based at least in part on a PUCCH payload size,
      wherein the PUCCH sequence comprises a short sequence when the PUCCH payload size is less than a threshold payload size and the PUCCH sequence comprises a long sequence when the PUCCH payload size is greater than or equal to the threshold payload size,
         wherein the short sequence comprises a quantity of elements that is less than a threshold quantity of elements and the long sequence comprises a quantity of elements that is greater than or equal to the threshold quantity of elements; and
      transmit the set of PUCCH repetitions using the PUCCH sequence, wherein each PUCCH repetition of the set of PUCCH repetitions is transmitted with different portions of the PUCCH sequence when the PUCCH sequence comprises a long sequence, and wherein each PUCCH repetition of the set of PUCCH repetitions is transmitted with an entirety of the PUCCH sequence when the PUCCH sequence comprises a short sequence.

2. The UE of claim 1, wherein the PUCCH sequence is a Gold-sequence or an M-sequence.

3. The UE of claim 1, wherein the one or more processors are further configured to:
   generate the set of PUCCH repetitions using the PUCCH sequence.

4. The UE of claim 3, wherein the one or more processors, to generate the set of PUCCH repetitions, are configured to:
   generate a set of bit sequences using a single generator for each resource element of each PUCCH repetition of the set of PUCCH repetitions.

5. The UE of claim 1, wherein the one or more processors are further configured to:
   determine a PUCCH sequence configuration for the PUCCH sequence; and
   wherein the one or more processors, to generate the PUCCH sequence, are configured to:
      generate the PUCCH sequence in accordance with the PUCCH sequence configuration.

6. The UE of claim 5, wherein the PUCCH sequence configuration includes at least one of: a size of the PUCCH sequence or an indication whether the PUCCH sequence is to be split or repeated across the set of PUCCH repetitions.

7. The UE of claim 5, wherein the one or more processors, to determine the PUCCH sequence configuration, are configured to:
   determine the PUCCH sequence configuration based at least in part on at least one of:
      whether orthogonal sequences or non-orthogonal sequences are to be used for the PUCCH sequence,
      a type of PUCCH repetition scheme,
      a coding rate of a nominal PUCCH repetition,
      an effective rate of the set of PUCCH repetitions, or
      a received indication.

8. The UE of claim 1, wherein the set of PUCCH repetitions is a set of actual PUCCH repetitions, and wherein the one or more processors, to transmit the set of PUCCH repetitions, are to:
   split a nominal PUCCH repetition, of a set of nominal PUCCH repetitions, into a plurality of actual PUCCH repetitions, of the set of actual PUCCH repetitions,
      wherein the nominal PUCCH repetition is a particular PUCCH repetition that is scheduled across a slot boundary; and
   transmit the set of actual PUCCH repetitions based at least in part on splitting the nominal PUCCH repetition into the plurality of actual PUCCH repetitions.

9. The UE of claim 8, wherein the PUCCH sequence is based at least in part on a quantity of nominal PUCCH repetitions in the set of nominal PUCCH repetitions; and
   wherein the plurality of actual PUCCH repetitions are encoded based at least in part on the PUCCH sequence.

10. The UE of claim 8, wherein the PUCCH sequence is based at least in part on a quantity of PUCCH repetitions in the set of actual PUCCH repetitions; and
    wherein the plurality of actual PUCCH repetitions are encoded based at least in part on the PUCCH sequence.

11. A method of wireless communication performed by a user equipment (UE), comprising:
    generating a physical uplink control channel (PUCCH) sequence for a set of PUCCH repetitions, wherein the PUCCH sequence is based at least in part on a PUCCH payload size,
       wherein the PUCCH sequence comprises a short sequence when the PUCCH payload size is less than a threshold payload size and the PUCCH sequence comprises a long sequence when the PUCCH payload size is greater than or equal to the threshold payload size, wherein the short sequence comprises a quantity of elements that is less than a threshold quantity of elements and the long sequence comprises a quantity of elements that is greater than or equal to the threshold quantity of elements; and transmitting the set of PUCCH repetitions using the PUCCH sequence, wherein each PUCCH repetition of the set of PUCCH repetitions is transmitted with different portions of the PUCCH sequence when the PUCCH sequence comprises a long sequence, and wherein each PUCCH repetition of the set of PUCCH repetitions is transmitted with an entirety of the PUCCH sequence when the PUCCH sequence comprises a short sequence.

12. The method of claim 11, wherein the PUCCH sequence is a Gold-sequence or an M-sequence.

13. The method of claim 11, further comprising:
generating the set of PUCCH repetitions using the PUCCH sequence.

14. The method of claim 13, wherein generating the set of PUCCH repetitions comprises:
generating a set of bit sequences using a single generator for each resource element of each PUCCH repetition of the set of PUCCH repetitions.

15. The method of claim 11, further comprising:
determining a PUCCH sequence configuration for the PUCCH sequence; and
wherein generating the PUCCH sequence comprises:
generating the PUCCH sequence in accordance with the PUCCH sequence configuration.

16. The method of claim 15, wherein the PUCCH sequence configuration includes at least one of: a size of the PUCCH sequence or an indication whether the PUCCH sequence is to be split or repeated across the set of PUCCH repetitions.

17. The method of claim 15, wherein determining the PUCCH sequence configuration comprises:
determining the PUCCH sequence configuration based at least in part on at least one of:
whether orthogonal sequences or non-orthogonal sequences are to be used for the PUCCH sequence,
a type of PUCCH repetition scheme,
a coding rate of a nominal PUCCH repetition,
an effective rate of the set of PUCCH repetitions, or
a received indication.

18. The method of claim 11, wherein the set of PUCCH repetitions is a set of actual PUCCH repetitions, and wherein transmitting the set of PUCCH repetitions comprises:
splitting a nominal PUCCH repetition, of a set of nominal PUCCH repetitions, into a plurality of actual PUCCH repetitions, of the set of actual PUCCH repetitions, wherein the nominal PUCCH repetition is a particular PUCCH repetition that is scheduled across a slot boundary; and
transmitting the set of actual PUCCH repetitions based at least in part on splitting the nominal PUCCH repetition into the plurality of actual PUCCH repetitions.

19. The method of claim 18, wherein the PUCCH sequence is based at least in part on a quantity of nominal PUCCH repetitions in the set of nominal PUCCH repetitions; and
wherein the plurality of actual PUCCH repetitions are encoded based at least in part on the PUCCH sequence.

20. The method of claim 18, wherein the PUCCH sequence is based at least in part on a quantity of PUCCH repetitions in the set of actual PUCCH repetitions; and
wherein the plurality of actual PUCCH repetitions are encoded based at least in part on the PUCCH sequence.

21. A non-transitory computer-readable medium storing a set of instructions for wireless communication, the set of instructions comprising:
one or more instructions that, when executed by one or more processors of a user equipment (UE), cause the UE to:
generate a physical uplink control channel (PUCCH) sequence for a set of PUCCH repetitions, wherein the PUCCH sequence is based at least in part on a PUCCH payload size,
wherein the PUCCH sequence comprises a short sequence when the PUCCH payload size is less than a threshold payload size and the PUCCH sequence comprises a long sequence when the PUCCH payload size is greater than or equal to the threshold payload size,
wherein the short sequence comprises a quantity of elements that is less than a threshold quantity of elements and the long sequence comprises a quantity of elements that is greater than or equal to the threshold quantity of elements; and
transmit the set of PUCCH repetitions using the PUCCH sequence, wherein each PUCCH repetition of the set of PUCCH repetitions is transmitted with different portions of the PUCCH sequence when the PUCCH sequence comprises a long sequence, and wherein each PUCCH repetition of the set of PUCCH repetitions is transmitted with an entirety of the PUCCH sequence when the PUCCH sequence comprises a short sequence.

22. An apparatus for wireless communication, comprising:
means for generating a physical uplink control channel (PUCCH) sequence for a set of PUCCH repetitions, wherein the PUCCH sequence is based at least in part on a PUCCH payload size,
wherein the PUCCH sequence comprises a short sequence when the PUCCH payload size is less than a threshold payload size and the PUCCH sequence comprises a long sequence when the PUCCH payload size is greater than or equal to the threshold payload size,
wherein the short sequence comprises a quantity of elements that is less than a threshold quantity of elements and the long sequence comprises a quantity of elements that is greater than or equal to the threshold quantity of elements; and
means for transmitting the set of PUCCH repetitions using the PUCCH sequence.

23. The apparatus of claim 22, wherein the PUCCH sequence is a single PUCCH sequence with greater than or equal to the threshold quantity of elements; and
wherein the means for transmitting the set of PUCCH repetitions comprises:
means for transmitting a first repetition, of the set of PUCCH repetitions, using a first portion of the single PUCCH sequence; and
means for transmitting a second repetition, of the set of PUCCH repetitions, using a second portion of the single PUCCH sequence.

24. The apparatus of claim 22, wherein the PUCCH sequence is a single PUCCH sequence with less than the threshold quantity of elements; and
wherein the means for transmitting the set of PUCCH repetitions comprises:

means for transmitting a first repetition, of the set of PUCCH repetitions, using an entirety of the single PUCCH sequence; and
means for transmitting a second repetition, of the set of PUCCH repetitions, using the entirety of the single PUCCH sequence.

\* \* \* \* \*